(12) United States Patent
Hochberg

(10) Patent No.: US 11,315,716 B2
(45) Date of Patent: Apr. 26, 2022

(54) PROCESS AND APPARATUS FOR THE MAGNETIZATION OF MAGNETIZABLE MATERIALS

(71) Applicant: The Procter & Gamble Company, Cincinnati, OH (US)

(72) Inventor: Scott David Hochberg, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 484 days.

(21) Appl. No.: 16/535,117

(22) Filed: Aug. 8, 2019

(65) Prior Publication Data

US 2020/0058430 A1    Feb. 20, 2020

Related U.S. Application Data

(60) Provisional application No. 62/718,402, filed on Aug. 14, 2018.

(51) Int. Cl.
*H01F 13/00* (2006.01)
*B41M 1/42* (2006.01)
(Continued)

(52) U.S. Cl.
CPC .............. *H01F 13/00* (2013.01); *B41M 1/42* (2013.01); *B41M 7/0081* (2013.01); *C09D 11/10* (2013.01)

(58) Field of Classification Search
CPC ...... H01F 7/0215; H01F 13/00; H01F 13/003; B41M 1/42; B41M 7/0081; C09D 11/10
See application file for complete search history.

(56) References Cited

U.S. PATENT DOCUMENTS

| | | | |
|---|---|---|---|
| 3,968,898 A | 7/1976 | Beer | |
| 5,027,966 A | 7/1991 | Yadock | |
| (Continued) | | | |

FOREIGN PATENT DOCUMENTS

| | | |
|---|---|---|
| CA | 2464734 A1 | 5/2003 |
| CN | 1261320 A | 7/2000 |
| (Continued) | | |

OTHER PUBLICATIONS

All Office Actions; U.S. Appl. No. 16/535,122.
(Continued)

*Primary Examiner* — Ramon M Barrera
(74) *Attorney, Agent, or Firm* — Steven Robert Chuey; Sarah M DeCristofaro

(57) ABSTRACT

An apparatus and method for magnetizing a magnetizable ink. The apparatus can include a first pair of first and second cylindrical magnetic arrays defining a first gap. The first and second cylindrical magnetic arrays can each have alternately spaced magnetized sections that are spaced apart axially by flux conducting elements. The apparatus can include a second pair of third and fourth cylindrical magnetic arrays defining a second gap. The third and fourth cylindrical magnetic arrays can each have alternately spaced magnetized sections that are spaced apart axially by flux conducting elements. The apparatus can include a third pair of fifth and sixth cylindrical magnetic arrays defining a third gap. The fifth and sixth magnetic array can have alternately spaced magnetized sections that are spaced apart axially by flux conducting elements. The cylindrical magnetic arrays can be positioned to receive a moving web substrate through the first, second, and third gaps.

20 Claims, 7 Drawing Sheets

(51) Int. Cl.
*B41M 7/00* (2006.01)
*C09D 11/10* (2014.01)

(56) References Cited

U.S. PATENT DOCUMENTS

| | | |
|---|---|---|
| 5,294,022 A | 3/1994 | Earle |
| 5,424,703 A | 6/1995 | Blume, Jr. |
| 5,428,332 A | 6/1995 | Srail |
| 5,505,305 A | 4/1996 | Scholz |
| 6,397,560 B1 | 6/2002 | Weder |
| 6,640,991 B1 | 11/2003 | Amanat |
| 6,749,551 B2 | 6/2004 | Metzler |
| 7,128,798 B2 | 10/2006 | Boudouris |
| 7,178,185 B1 | 2/2007 | Nattler |
| 8,556,876 B2 | 10/2013 | Beckman |
| 9,062,222 B2 | 6/2015 | Nilsson |
| 9,305,598 B2 | 4/2016 | Rossiter |
| 9,533,786 B1 | 1/2017 | Feinstein |
| 2002/0027138 A1 | 3/2002 | Hyobu |
| 2003/0142887 A1 | 7/2003 | Sleight |
| 2003/0218525 A1 | 11/2003 | Sugawara |
| 2004/0001973 A1 | 1/2004 | Gao |
| 2004/0141665 A1 | 7/2004 | Yung |
| 2004/0241394 A1 | 12/2004 | Burrows |
| 2005/0056655 A1 | 3/2005 | Gary |
| 2005/0230465 A1 | 10/2005 | Metzler |
| 2005/0242097 A1 | 11/2005 | Morin |
| 2005/0285749 A1 | 12/2005 | Schmidt-troschke |
| 2006/0168767 A1 | 8/2006 | Huang |
| 2006/0231562 A1 | 10/2006 | Carroll |
| 2006/0283750 A1 | 12/2006 | Villars |
| 2008/0281284 A1 | 11/2008 | Garfield et al. |
| 2010/0308039 A1 | 12/2010 | Miros |
| 2011/0253571 A1 | 10/2011 | Rothbaum |
| 2012/0018428 A1 | 1/2012 | Norman |
| 2012/0073242 A1 | 3/2012 | Nilsson |
| 2012/0076995 A1 | 3/2012 | Nilsson |
| 2012/0103506 A1 | 5/2012 | Love |
| 2012/0111773 A1 | 5/2012 | Ball, Sr. et al. |
| 2012/0128273 A1 | 5/2012 | Lytle |
| 2012/0213942 A1 | 8/2012 | Mcmullen |
| 2012/0216374 A1 | 8/2012 | Manuello |
| 2013/0032503 A1 | 2/2013 | Nobile |
| 2013/0061431 A1 | 3/2013 | Naftali |
| 2014/0008425 A1 | 1/2014 | Clark |
| 2014/0034080 A1 | 2/2014 | Paquet |
| 2014/0093299 A1 | 4/2014 | Lambert |
| 2015/0023223 A1 | 1/2015 | Robbins |
| 2015/0091680 A1 | 4/2015 | Gary |
| 2015/0196955 A1 | 7/2015 | Naftalin |
| 2015/0305402 A1 | 10/2015 | Bourgoin |
| 2016/0039575 A1 | 2/2016 | Murray |
| 2016/0095763 A1 | 4/2016 | Mazor |
| 2016/0221722 A1 | 8/2016 | Burke |
| 2017/0066559 A1 | 3/2017 | Kim |
| 2017/0105556 A1 | 4/2017 | Tarpey |
| 2017/0159295 A1 | 6/2017 | Warner |
| 2017/0275056 A1 | 9/2017 | Boudouris |
| 2018/0042403 A1 | 2/2018 | Storace |
| 2018/0339806 A1 | 11/2018 | Sugita |
| 2019/0133281 A1 | 5/2019 | Munie |
| 2020/0055635 A1 | 2/2020 | Hochberg |
| 2020/0055636 A1 | 2/2020 | Hochberg |
| 2020/0055659 A1 | 2/2020 | Hochberg |

FOREIGN PATENT DOCUMENTS

| | | |
|---|---|---|
| CN | 2693663 Y | 4/2005 |
| CN | 1774371 A | 5/2006 |
| CN | 101356597 A | 1/2009 |
| CN | 201481473 U | 5/2010 |
| CN | 103210247 A | 7/2013 |
| CN | 103237473 A | 8/2013 |
| CN | 103332376 A | 10/2013 |
| CN | 203529044 U | 4/2014 |
| CN | 204726914 U | 10/2015 |
| CN | 105026275 A | 11/2015 |
| CN | 105644924 A | 6/2016 |
| CN | 205998313 U | 3/2017 |
| DE | 202009000499 U1 | 3/2009 |
| EP | 741555 B1 | 12/1997 |
| EP | 665737 | 12/1998 |
| EP | 1683736 B1 | 3/2010 |
| EP | 1507659 B1 | 2/2011 |
| EP | 3038938 B1 | 10/2018 |
| EP | 2935029 B1 | 2/2019 |
| EP | 3123489 B1 | 5/2019 |
| FR | 2680761 A1 | 3/1993 |
| GB | 1121773 A | 7/1968 |
| JP | 2010046152 A | 3/2010 |
| JP | 2010223107 A | 10/2010 |
| JP | 2012101848 A | 5/2012 |
| JP | 2015020779 A | 2/2015 |
| JP | 2018038596 A | 3/2018 |
| WO | WO2006135313 A1 | 12/2006 |
| WO | WO2014096427 A1 | 6/2014 |
| WO | WO2015132025 A1 | 9/2015 |
| WO | WO2016139170 A1 | 9/2016 |
| WO | 201 7002139 A1 | 1/2017 |
| WO | WO201721398 A1 | 2/2017 |
| WO | WO2017172542 A1 | 10/2017 |
| WO | 2018054819 A1 | 3/2018 |

OTHER PUBLICATIONS

All Office Actions; U.S. Appl. No. 16/535,118.
All Office Actions; U.S. Appl. No. 16/535,119.
International Search Report and Written Opinion dated Nov. 19, 2019, PCT/US2019/045594, 11 pgs.
International Search Report and Written Opinion dated Oct. 18, 2019, PCT/US2019/045595, 12 pgs.
International Search Report and Written Opinion dated Oct. 18, 2019, PCT/US2019/045596, 12 pgs.
International Search Report and Written Opinion dated Oct. 23, 2019, PCT/US2019/045597, 12 pgs.

PROCESS AND APPARATUS FOR THE MAGNETIZATION OF MAGNETIZABLE MATERIALS

FIELD OF THE INVENTION

Embodiments of the technology relate, in general, to an apparatus and process for effecting multipolar magnetization of a web material, and the material made thereby.

BACKGROUND OF THE INVENTION

Imprinting magnetic poles of alternating polarity on a web substrate can be achieved by causing a substrate having thereon a magnetizable material to travel in the immediate vicinity of the active portion of a magnetizing apparatus such as in the air gap of such an apparatus producing an adequate magnetic field. The multipolar magnetization of the material can be of the traversing or symmetrical type, which means that the two faces of the strip or of the sheet exert a magnetic attraction or pull strength of approximately the same value. On the other hand, it can be of a non-traversing or biased type and, in this case, one of the faces of the material exerts a biased or higher magnetic pull strength than the other face. The weaker or magnetically unbiased face may be advantageous for other uses and is able to receive, for example, some decoration, paint or an adhesive, or alternatively a sheet of mild magnetic material.

An apparatus producing an adequate magnetic field to magnetize to some degree a magnetizable material of interest in the current disclosure can be one of two types: (1) a pair of two flux-pumping arrays as disclosed in U.S. Pat. No. 5,428,332 to Srail et al.; or, (2) a pair of two diametric arrays as disclosed in U.S. Pat. No. 5,424,703 to Blume, Jr. Both types of arrays, which are each taught individually to be used in pairs of identical axially-parallel rollers having an air gap therebetween for the passage of a web substrate, can produce in the gap a magnetic field sufficient to magnetize a magnetizable material to some degree.

A diametric array can be advantageously beneficial because it can produce in a magnetizable material of a web substrate a greater pole area and smaller transition zone between pole areas. A flux-pumping array can be advantageously beneficial because it can product a greater flux density in a magnetizable material of a web substrate.

Thus, in general, a diametric array can create a magnetized web substrate with a greater pole area, but a weaker magnetic field than that produced by a flux pumping array. It is believed the weaker holding force is due to the relatively lower magnetic field strength in the gap of a diametric array compared to the magnetic field strength produced in the gap of a flux pumping array. Both flux density and pole area contribute to the desired response of holding force of a web substrate magnetized, but flux density plays a larger role. The lower field strength in the diametric arrays may be able to saturate a lower coercivity material (i.e. ferrite) but not other materials, such as neodymium iron boron particles in a magnetizable composition, such as magnetizable ink.

There remains an unmet need, therefore, for an apparatus and process for producing in a magnetizable web a magnetizing force greater than that achievable by known flux-pumping or diametric arrays.

DETAILED DESCRIPTION OF THE INVENTION

Figure 1:
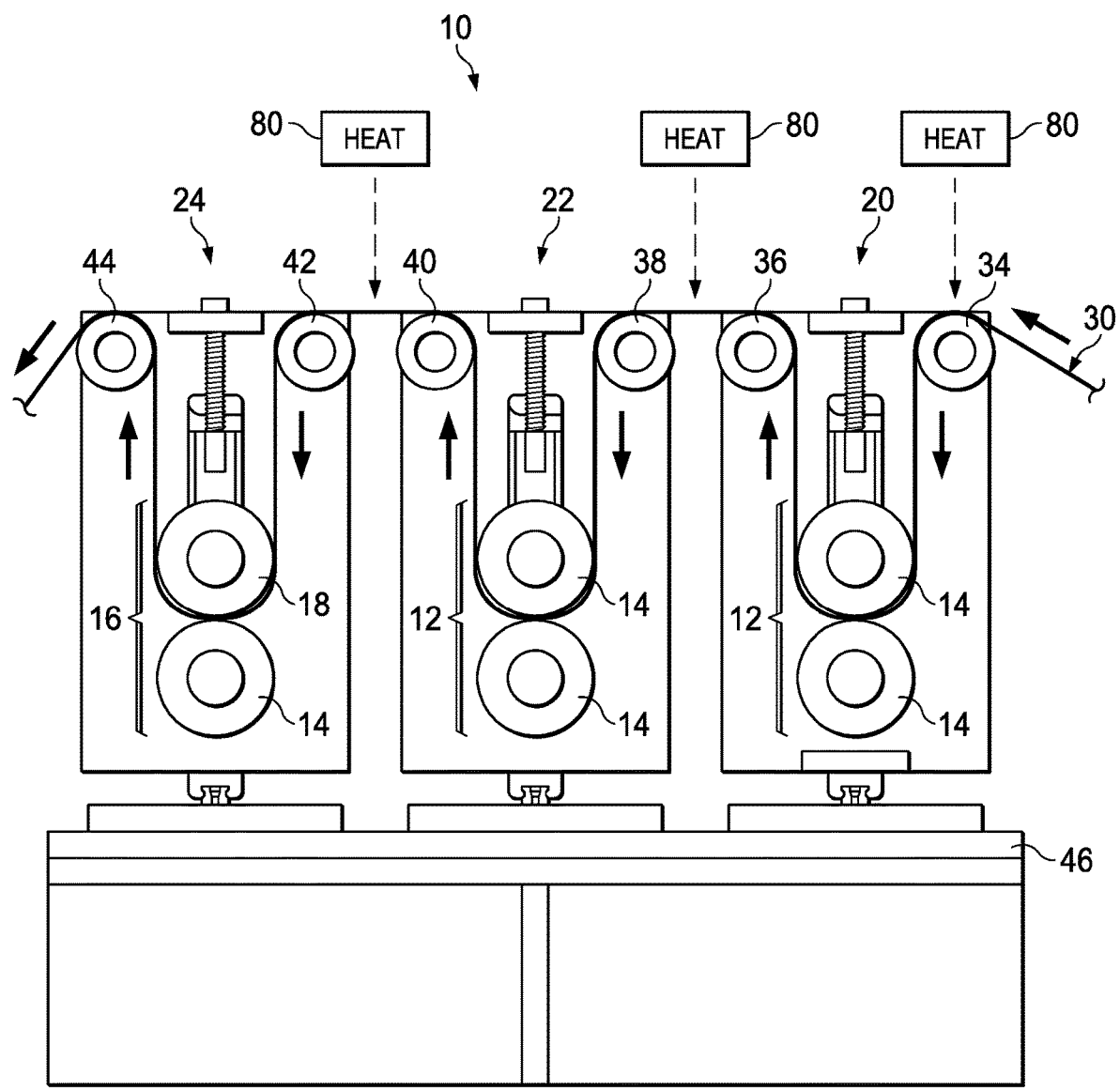
FIG. 1 is a schematic side view of an embodiment of an apparatus of the disclosure.

Certain embodiments are hereinafter described in detail in connection with the views and examples of FIGS. 1-12, wherein like numbers refer to like elements throughout the views.

Various non-limiting embodiments of the present disclosure will now be described to provide an overall understanding of the principles of the structure, function, and use of the apparatuses, systems, methods, and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific FIG. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Addressing the problems associated with magnetization of magnetizable materials can be achieved by use of embodiments of an apparatus and process disclosed herein. The embodiments disclosed herein offer advantages in producing a magnetic force in magnetizable materials, including producing relatively higher magnetic forces in an apparatus having relatively fewer unit operations, lowering the cost of magnetic materials sufficient for flexible packaging, lowering the cost of producing magnetic materials for use in flexible packaging, lowering the cost of producing packaging having closures made with magnetic materials, and general efficiency of producing relatively high magnetic force in non-ferrite materials, including rare earth materials.

The disclosure relates generally to a magnetized material realizing more of its magnetic potential, for example as noted by its hysteresis properties, and to a process and an apparatus for the production of this magnetized material. The disclosure relates generally to a deposited, for example, printed, magnetizable material, such as ink, on a flexible polymer web or on paper. The deposited magnetizable material and the flexible polymer web are referred to herein as the web substrate 30, but it is understood that the disclosure refers to magnetizable materials generally.

The web substrate of the present disclosure can comprise a polymeric binder or matrix which can contain magnetic particles. It can be advantageous that the matrix is an elastomeric or thermoplastic material such as, for example, rubbery compositions which can be made in appropriate configuration and which can accept appropriate loading of magnetic particles, specifically including chlorinated and chlorosulfonated poly-ethylene, polyisobutylene, nitrile rubbers, rubbers made from ethylene propylene and EPDM elastomers, ethylene vinyl acetate, acrylate elastomers and copolymers or blends based on the foregoing.

However, the application of the apparatus and process is not limited to any specific binder material and the selection will depend upon the ultimate application of the resulting material. Likewise, the apparatus and process is applicable to a broad range of magnetic fillers ranging from the low energy ferrite magnets, to the rare earth magnets. These fillers can be in the form of particles or powder as is appropriate. Specific example of suitable magnetic particles can include hard ferrite magnets such as barium ferrite, strontium ferrite and lead ferrite, and low coercivity rare earth magnets. Typical loadings of these fillers are in the range of from about 50 percent to about 70 percent, and can be from about 55 percent to about 85 percent by volume with the remaining percent being binder. Once again, the choice of the filler and the ratio of magnetic filler to matrix will depend upon the particular application for the product. Typically, the ferrite filler and loading will be selected so that the magnetic properties of the pre-magnetized ferrite material can be described as having a BhAX of from about 0.5 to about 1.6 MGOe; a Br of about 1,500 to about 2,600 G; a He of about 1,200 to about 2,300 Oe; a Hci of about 2,000 to about 4,000 Oe, taken through the thickness, i.e., perpendicular to the lateral face of the sample. The neodymium-boron iron ("NEO") magnets should be modified to a lower Hci of about 5,000 oersteds by compositional and process changes. The Delco melt spin process for NEO is optimum for providing particulate material to be used with the binder in the strips and sheets in accordance with the invention. Additives may be used as are known in the art including, for example, antioxidant, UV stabilizers, fungicides, antibacterial agents, and processing aids such as internal plasticizers and processing aids.

The non-magnetized magnetizable material may be manufactured as is known in the art and according to the product application. In an embodiment, the material can be produced by calendering in sheet form or extrusion in magnetizable web substrate form having a thickness ranging from about 0.010 inch to about 0.250 inch and over. In an embodiment, a magnetizable material can be deposited, such as by printing or extrusion, onto a polymeric web substrate. Further, the magnetizable material and/or the web substrate having deposed thereon the magnetizable material, that is web substrate 30, can be generally planar and continuous on at least two parallel surfaces. In an embodiment, the magnetizable material comprises a magnetic ink available from ACTEGA North America, Delran, N.J., and can comprise a substrate, a primer and magnetic ink. A water-based adhesion assisting primer can be deposited and cured on a substrate, such as a polymer film. A magnetic ink can be deposited on top of the substrate and cured using a UV light source. The magnetic ink can comprise monomers, oligomers, photoinitiators and isotropic neodymium iron boron particles. Multiple layers of the magnetic ink can be used to increase the amount of magnetizable material on the substrate.

Referring to FIG. 1, there is schematically shown an example apparatus 10 for magnetizing a magnetizable material, particularly a magnetizable material comprising a web substrate. The apparatus 10 in FIG. 1 is a hybrid apparatus comprising both flux-pumping array components and diametric array components, with advantages discussed in the description below. In general, the apparatus can include one or more pairs 12 of magnetic arrays 14 of the flux-pumping type, and one or more pairs 16 of a hybrid flux-pumping array 14 and a diametric magnetic array 18, as disclosed more fully below.

FIG. 1 is a side schematic illustrating three magnetic array stations, each comprising a pair of cylindrical magnetic arrays, referred to herein as "magnetic arrays". A first magnetic array station 20 can include a pair 12 of flux-pumping magnetic arrays 14 in axially-parallel alignment, as more fully discussed below. Likewise, a second magnetic array station 22 can include a pair 12 of flux-pumping magnetic arrays 14 in axially-parallel alignment. A third magnetic array station 24 can include a hybrid pair 16 of magnetic arrays including one flux-pumping magnetic array 14 and one diametric magnetic array 18, as more fully discussed below. In general, any number of pairs 12 flux-pumping magnetic array, including one or zero, can be utilized. In general, more than one pair 16 of hybrid magnetic arrays can be utilized. In an embodiment, a single pair 16 of hybrid magnetic arrays can be utilized.

A web substrate 30 comprising a magnetizable material can enter the apparatus 10 at a first guide roller 34 which can be heated and can be an idler or driven roller. The web substrate 30 comprising a magnetized material can exit the apparatus 10 at sixth guide roller 44, which can be heated, and can be an idler or driven roller. In general, any number of guide rollers, such as guide rollers 34-44, all or none of which can be heated and all or none of which can be idler or driven, can be employed depending on the number of magnetic array stations utilized in the apparatus 10. Any number of guide rollers can be utilized in the apparatus 10 as necessary according to web handling requirements, as is known in the art. As depicted in FIG. 1, in an embodiment, guide rollers can be positioned to ensure that web substrate 30 wraps one of the magnetic arrays at each magnetic array station at a predetermined angle of wrap at each of the magnetic array stations. In an embodiment, the same side of webs substrate 30 contacts one of the magnetic arrays in each magnetic array station. In an embodiment, the magnetic array contacted and/or partially wrapped by web substrate 30 is considered a contacting magnetic array, and the other magnetic array in each magnetic array station is referred to as a supporting magnetic array.

A base plate 46 can support each of the magnetic array stations 20, 22, and 24, which can otherwise be supported by framework to be operatively positioned as is known in the art. In an embodiment, the first two magnetic array stations, 20 and 22 can include a pair 12 of flux-pumping magnetic arrays 14 as described with respect to FIGS. 2-4. Each flux-pumping array 14 comprises alternating series of uniform size magnetic disks 50 and generally uniform size flux conducting elements 52. The direction of magnetization of the magnetic disks 14 is axial with the poles being located at the circular faces of the disk. Two magnetic disks 50 can be situated on either side of one flux conducting element 52 with the directions of magnetization N-S being opposed. In general, for flux-pumping arrays, like poles, i.e., north-north or south-south are separated by flux conducting elements. The magnetic disks 50 and the flux conducting elements 52 can be generally circular and can have a similar outer diameter so that a smooth continuous cylindrical surface 54 can be formed. The magnetic disks 50 and flux conducting elements 52 can have a central hole so that the array 14 is tightly journaled about an axle 56 and rotates without it. The axle 56 can carry a bushing 58 on either end for rotation relative to the apparatus 10. The magnetic arrays 14 of magnetic discs 50 and flux conducting elements 52 can be held together mechanically, on a threaded arbor by a washer 60 and nut 62 which when tightened overcomes the magnetic repulsion of the magnetic disks. As the flux conducting elements 52 serve to channel the magnetic flux produced by the opposing magnets towards the flux gap between the surfaces of the magnetizing medium, the north and south poles separated by neutral zones alternate. These polar moments are situated over the same width of the web substrate as the flux conducting elements and are situated at the point where the flux conducting elements contact the surface of the magnetizing medium. There is also some flux loss to the inside diameter, but this is usually a small percentage of the total flux generated.

Two opposing flux-pumping arrays 14 can be used together to form a flux-pumping magnetic array pair 12 (i.e., top and bottom arrays). One or both flux-pumping arrays 14 of a pair 12 can contact or at least effectively contact either side of the web substrate 30. The two arrays 14 of a pair 12 can be placed in circumferential alignment so that the similar elements, i.e., magnetic disks 50 or flux conducting elements 52 of each array face each other and the directions of magnetization N-S of two facing main magnets are opposed to each other. The proximity of the opposing array and the opposing poles induces a flux circuit through the flux conducting elements 52. It is believed that a magnetic imprint is achieved when the web substrate 30 passes between the two arrays and completes the circuit. Thus, the web substrate 30 can be imprinted with a pole opposite from the surface contacting the polar moment of the flux conducting element 52. Each array 14 can end with a distal flux conducting element 64 on either side. The distal flux conducting elements 64 can have a thickness which is one half the thickness of the intermediate flux conducting elements 52. It is believed that this arrangement assures that the intensity of the magnetic flux in the distal flux conducting elements 64 will correspond with the intensity of the intermediate flux conducting elements 52.

The flux conducting elements 52 and the magnetic disks 50 can have the shape of circular discs having a diameter and thickness (which can be considered a width in the context of spacing across the face of the array), and having an internal bore which receives a non-ferromagnetic axis to facilitate a cylindrical external surface of revolution. Depending on the circumstances, the arrays can be driving rolls or they can freely rotate about their axes.

Figure 2:
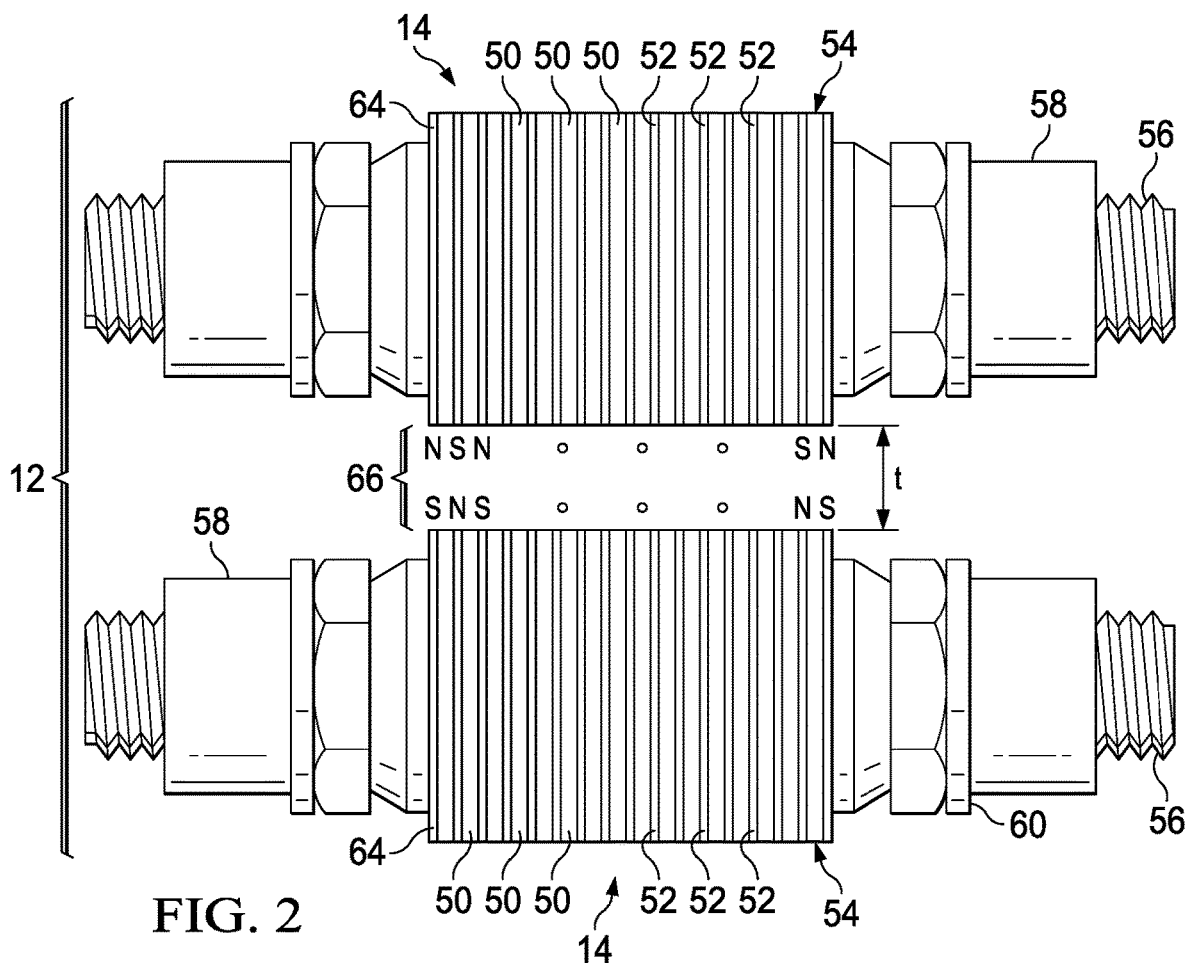
FIG. 2 is a front view of a pair of flux-pumping magnetic arrays.
Figure 3:
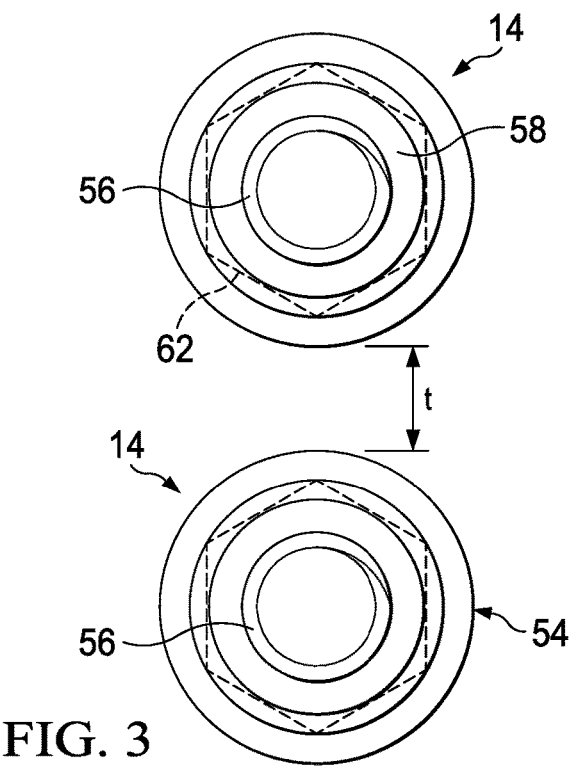
FIG. 3 is a side view of a pair of flux-pumping magnetic arrays.
Figure 4:
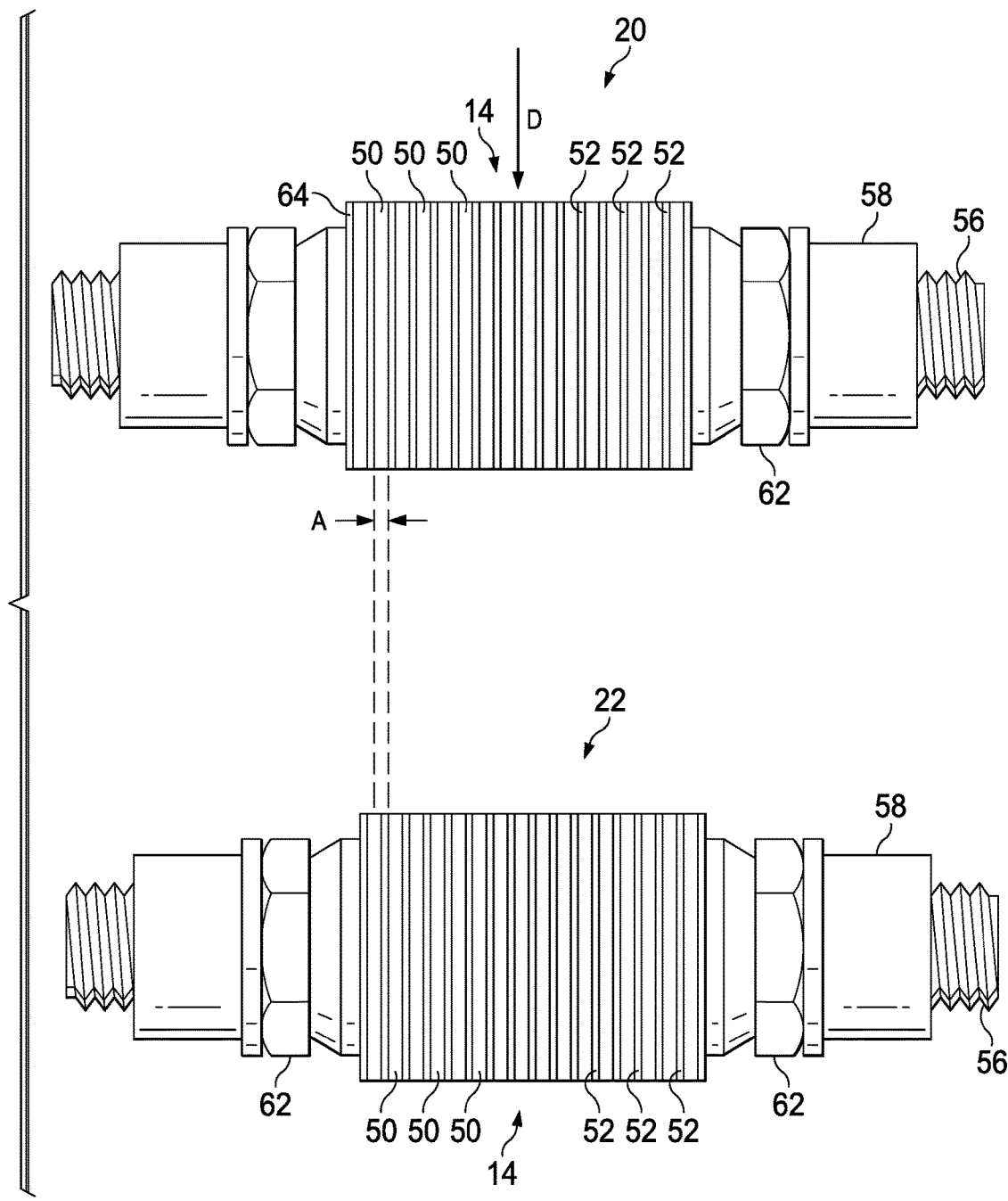
FIG. 4 is top view of a pair of flux-pumping magnetic arrays.

The pair 12 of flux-pumping magnetic arrays 14 shown in FIGS. 2-4 can comprise two arrays on their large faces of circular elements which are alternately permanent magnets made, for example, of a neodymium iron boron composition with a high coercive field, and induced flux and flux conducting elements 16 having an induced flux and being made from, for example, of an iron cobalt alloy containing 49 percent of cobalt. The web substrate 30 can travel in a plane approximately parallel to the circular interfaces of the members of the array pair 12. The two arrays 14 can define an air gap 66 defining a distance t between each array 14. Each magnetic disk 50 and each flux conducting element 52 of one of the arrays can be situated opposite a magnetic disc 50 and a flux conducting element 52 of the opposing array 14, respectively. Moreover, in the case of two facing magnetic discs 50 on either side of the air gap 66, the directions of magnetization can oppose each other. This, therefore, produces in the air gap at right angles to the flux conducting elements 52, a succession of field lines in alternating directions, which can imprint an alternating succession of north and south poles separated by neutral zones over the width of the substrate 30 traveling in the air gap 66.

The flux-pumping arrays 14 can be formed by alternating magnetitic discs 50 and flux conducting elements 52 in the form of circular discs which are movable about an axis and have a cylindrical lateral surface and rotate at such a speed that the web substrate 30 is prevented from sliding relative to one or both arrays. Further, the web substrate 30 can be held in alignment by an interference type guide which abuts one lateral edge of the web substrate 30 and which biases the web substrate 30 into contact with an opposing lateral guide. These guides can be made from a low-friction material to avoid wear of the guides during use.

The alternating succession of north and south poles separated by neutral zones over the width of the substrate 30 can be altered. For example, poles can be widened and neutral zones can be decreased, by a second pass through a second magnetic array station 22, that can comprise a second pair 12 of flux-pumping arrays 14, with the second pair of flux-pumping arrays being axially offset with respect to the polar alignment of the first pair. The amount of axial offset can be selected according to desired pole width and, can be influenced by the number of pairs 12 are utilized.

Referring to FIG. 4, there is shown a top view of the flux-pumping arrays 14 in the first magnetization station 20 and the second magnetization station 22. In an embodiment, the second magnetization station 22 can be identical to the first magnetization station 20, except that the pair 12 of flux-pumping arrays 14 can be offset axially a distance A relative to those of the first magnetization station. As the web substrate 30 travels in the direction of arrow D, it can remain on a generally straight path in that direction (albeit in a path out of plane as it traverses the various rolls of the apparatus), but the magnetic imprinting of magnetic poles thereon can result in widened poles due to the offset of the second pair 12 of flux-pumping arrays 14 in second magnetizing station 22. The offset distance A, shown in FIG. 4 can be equal to the width of the magnetic disk 50 or the flux conducting element 52.

Referring again to FIG. 1, web substrate 30 can leave the second magnetizing station 22 and can be guided to third magnetizing station 24 which can have another pair 16 of magnetic arrays. However, in the illustrated embodiment, the third pair 16 of magnetic arrays in the third magnetizing station 24 can include one flux-pumping array 14, as described above, and one diametric magnetic array 18.

A diametric magnetic array is similar in many respects to a flux-pumping magnetic array, however, in a diametric magnetic array there are no flux conductor elements 52. In a diametric magnetic array, magnetic disks 50, like the magnetic disks 50 of the flux-pumping arrays described above, be in the form of thin circular disks having two parallel faces. The diameter of the faces presents the plate-like magnet's longest axis, and the direction of magnetization is parallel to the faces. The perimeter or circular edge rimming each plate-like magnet is at right angles to each face. Each magnet has a north pole and a south pole, located at diametrically opposite positions on the perimeter. The magnetic disks 50 in each diametric array 18 can be parallel to one another with their adjacent unlike poles adjoining so that the magnets strongly attract each other magnetically and are magnetically coupled. The plate-like magnets can be stacked face to face to form a right cylindrical stack that is a cylindrical array having similar dimensions as the flux-pumping array with which it is paired. Like the flux-pumping arrays 14 described above, the magnetic disks 50 of a diametric array 18 can have a central hole so that the array 18 is tightly journaled about an axle 56 and rotates without it. The axle 56 can carry a bushing 58 on either end for rotation relative to the apparatus 10. As well, a nut 62 can be tightened to mechanically couple the array.

Figure 5:
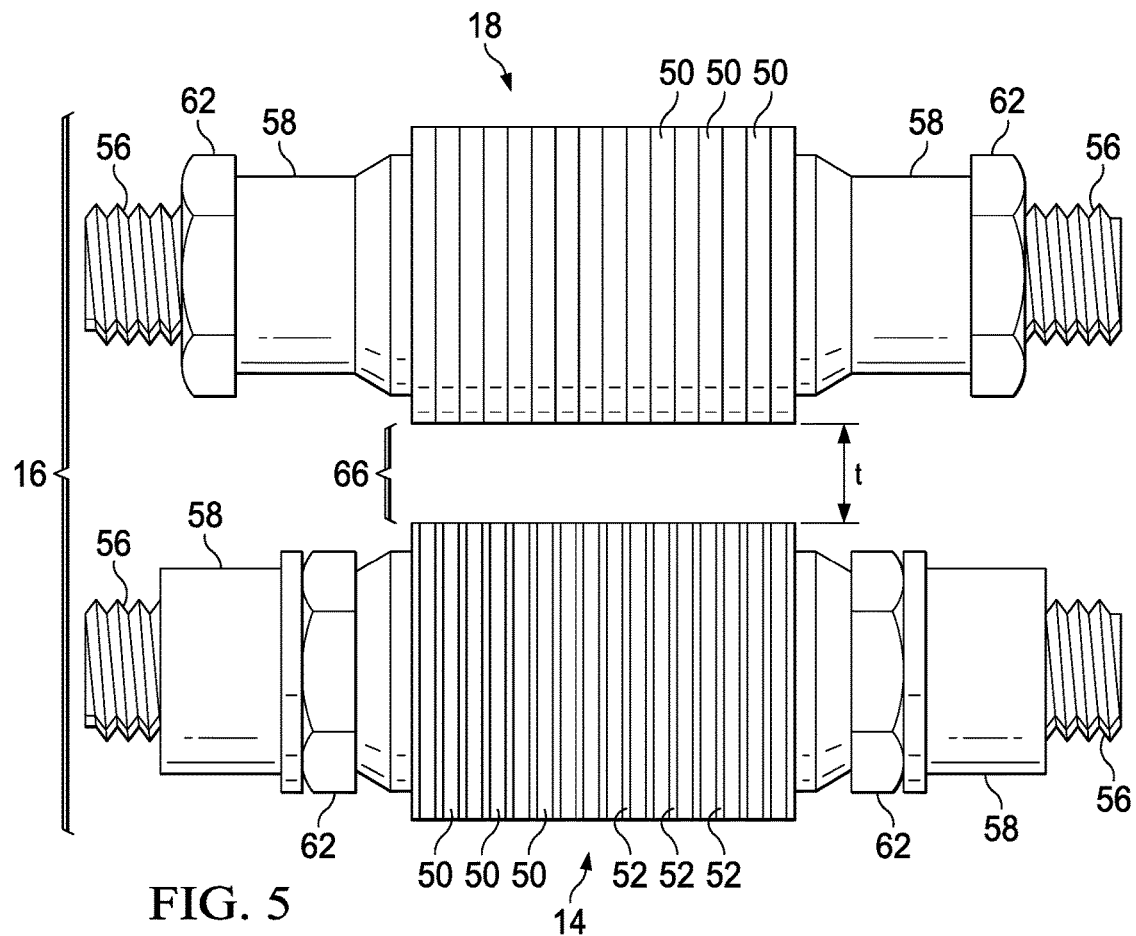
FIG. 5 is front view of a hybrid pair of magnetic arrays, with one array being of the flux-pumping type and one array being of the diametric type.
Figure 6:
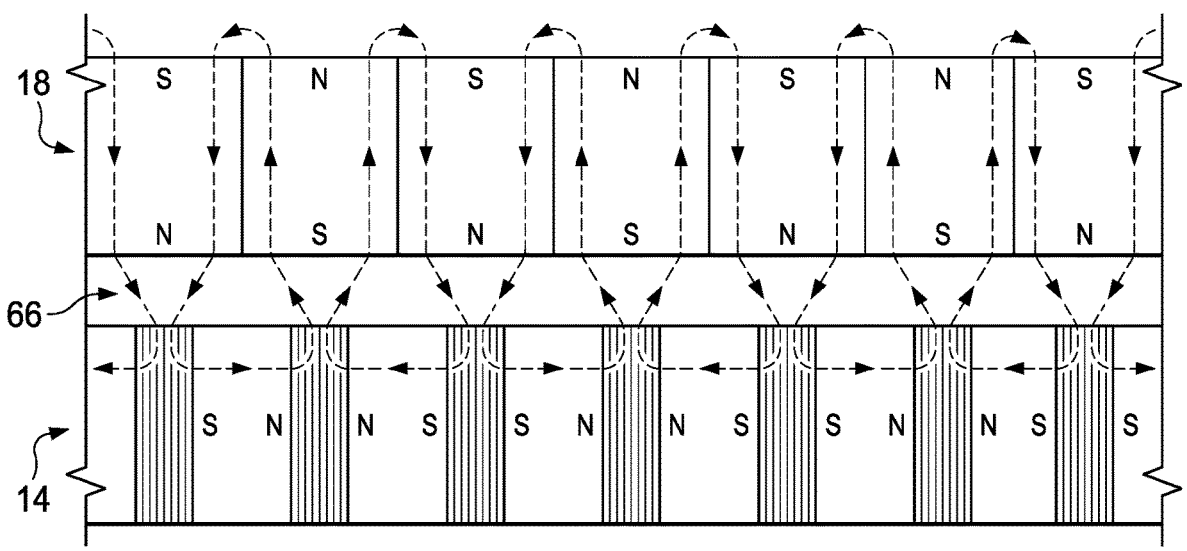
FIG. 6 is a schematic diagram of the flux field of a hybrid magnetic array pair.
Figure 7:
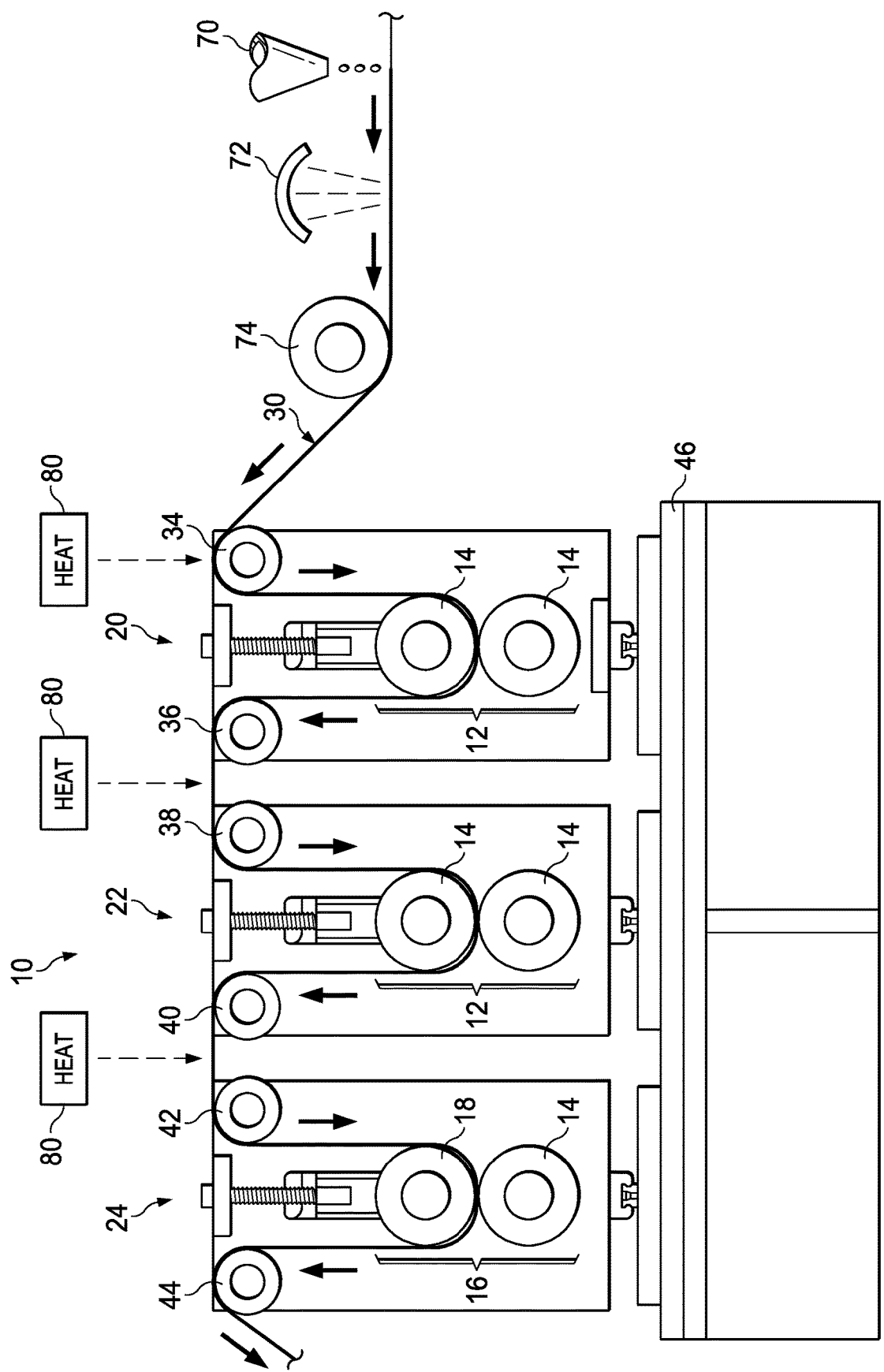
FIG. 7 is a schematic side view of an embodiment of an apparatus of the disclosure.
Figure 8:
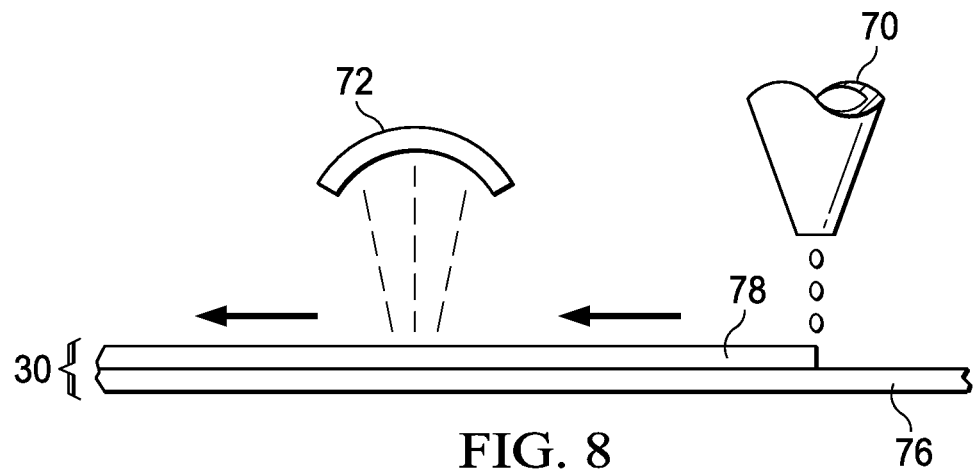
FIG. 8 is a schematic side view of an embodiment of a web substrate of the disclosure.
Figure 9:
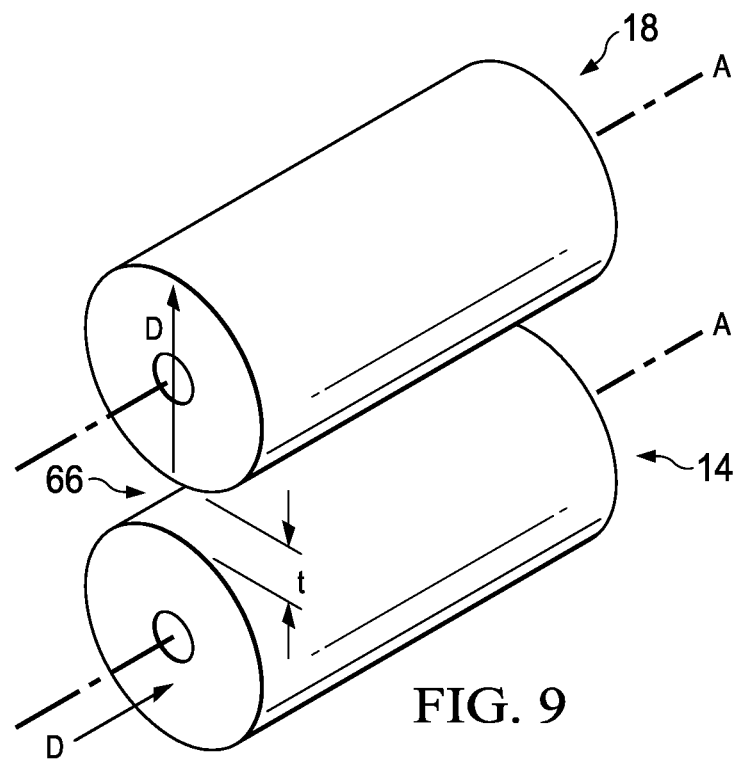
FIG. 9 is a schematic perspective view of a pair or magnetic arrays.

A pair 16 of magnetic arrays of magnetizing station 24 is depicted in front view in FIG. 5. As shown, the diametric magnetic array 18 comprises individual permanent magnets each designated by 50. As shown schematically in FIG. 9, each magnetic disk 50 of the diametric magnetic array 18 can have a direction of magnetization D which is perpendicular (normal) to the air gap 66 developed across the distance t between the arrays 14, 18 of the third pair 16 of arrays which is parallel to the faces of the magnets of the arrays. The direction of magnetization D of the diametric magnetic array 18 is parallel to the longest axis of the magnet, which in an embodiment is its diameter. In an embodiment, each magnetic disk 50 has its poles on the edge (the peripheral surface between the faces), a north pole on one end and a south pole on the diametrically opposite end. The magnetic length of each magnet is the distance measured between its poles in the direction of magnetization which, for a circular plate-like magnet 18, is equal to its diameter. The direction of magnetization is perpendicular to the shortest dimension of the magnet (its thickness). Magnet length is selected to provide the degree of magnetization needed for the particular web substrate and/or magnetizable material to be magnetized. For the flux pumping magnetic array 14, the direction of magnetization D is parallel to the axis A of the cylindrical magnetic array. In conjunction, the pair of magnetic arrays of a hybrid magnetic array can produce the magnetic field in the gap 66 as depicted in FIG. 6.

Because in a diametric array each plate-like magnetic disk 50 can facially engage an adjacent magnetic disk 50 in the array, it would be expected that each pair of magnets 50 would "short circuit" one another and would manifest little useful external flux. However, in the present disclosure, it has been unexpectedly found that the useful external flux follows a path indicated in FIG. 6. As shown in FIG. 6, the flux lines follow a path that aids in increasing the pole coverage on the magnetizable web substrate 30. This is believed to be because the interaction between the diametric array and the flux-pumping array. The flux-pumping array is believed to increase the strength of the external magnetic field in the gap to a strength sufficient to at least partially magnetize a material while the diametric array shapes the pole area on the contacting surface of the non-traversing magnetized material.

In an embodiment, as depicted schematically, web substrate 30 can have deposited thereon a magnetizable material by deposition station 70. Deposition station 70 can be a printer, and the magnetizable material can be a magnetic ink. As shown in the schematic diagram of FIG. 8, a polymeric web 76, such as a polymeric film, can be advanced under or through a printing apparatus 70, such as a flexographic printer, which can deposit a magnetic ink 78 thereon. In an embodiment, the magnetic ink can be curable in a curing station 72, such as a UV-light curing station in with a UV-curable magnetic ink can be cured. Once cured, the web substrate 30 can enter into the magnetization apparatus 10 and through a series of magnetizing stations, as discussed above. In general, a web deposited with a UV curable material can pass under a lamp emitting light in the UV spectrum to initiate polymerization. Examples of UV (or polymerization initiator sources) light sources are mercury vapor UV lamps, microwave UV lamp, UV-LED lamps, and electron beam sources.

In an embodiment, heat can be applied by heating sources 80 in various places in apparatus 10 to raise the temperature of the web substrate and magnetizable material. In general, a heat source can be located in operative proximity to one of the first, second, or third pairs of cylindrical magnetic arrays. By "operative proximity" is meant that the heat source can be located such that the heat it provides can be used to raise the temperature of the web substrate at or before one of the first, second, or third magnetic arrays. Heat can be supplied by radiant heat sources, convective heat sources, or conductive heat sources, each as are known in the art. Raising the temperature of web substrate 30 can increase the holding force of the magnetizable material at room temperature following magnetization. In general, heating can be applied by means known in the art to raise the temperature of the web substrate 30 at the magnetic array pairs. Heat can be applied to raise the temperature to a value determined by the heated material, including the web substrate, magnetizable ink, or other components. In an example, annealed PET can be heated up to about 200 degrees C., which is below the magnetic particle's Curie Temperature. The web substrate can be heated by heated rolls, hot air, IR lamps, and the like. In an embodiment, elevated temperatures can be induced during magnetization, not necessarily between stations.

A magnetized web substrate produced by the apparatus and process described herein can have a generally uniform pattern of lengthwise (i.e., machine direction) longitudinal, continuous magnetic poles separated by neutral zones. For example, the web substrate can appear to have stripes of poles and neutral zones, the stripes extending in the machine-direction in a spaced-apart manner across the width, i.e., the cross-direction. The width of the magnetic poles and the width of the neutral zones can be modified as necessary by modifying the width of the magnetic disks 50, the flux conducting elements 52, and the axial offset of one pair 12 of arrays with respect to another.

Measured data indicates that the magnetic force attraction of a material magnetized by the apparatus and process described herein can be relatively greater than that achieved in known apparatuses and systems. For example, the data shown in Table 1 below which is measured according to the Magnetic Separation Test below shows that the greatest relative magnetic force attraction can be achieved by a flux pumping array followed by a hybrid array.

TABLE 1

Magnetic Holding Force

| Magnetization Type | Holding Force per Area (N/cm2) |
|---|---|
| One Set Diametric Arrays | 0.036 |
| One Set Flux Pumping Arrays | 0.100 |
| Two Sets Flux Pumping Arrays with axial offset) | 0.163 |
| Flux Pumping Aarray Followed by Hybrid Array | 0.203 |
| Hybrid Array Followed by Flux Pumping Array | 0.141 |

Magnetic Separation Test:

Overview: The Magnetic Separation Test measures the force versus distance to separate web substrates of magnetized film samples joined in a separable magnetically contacting state, as disclosed herein. The test measures the force to separate two magnetized film samples in the orthogonal direction relative to the samples' magnetized surfaces. The Magnetic Separation Test is described below with respect to test system 100 shown schematically in FIGS. 10-12.

Equipment:
  Constant Rate of Displacement Universal Test Frame, for example such as MTS Insight Series with MTS TestWorks 4 Software.
  10 N load cell.
  Upper and lower flat, parallel-face, circular steel compression platens, each with a diameter of 25 mm
  Compressible foam, with thickness of 5 mm affixed to, and covering the surface of, both the upper and lower compression platens.
  Double-sided tape having sufficient holding capacity to hold magnetically coated polymer film during testing, as described below.
  15 mm JDC strip cutter.
  25 mm precision gage block Sample Preparation:
  Samples are magnetized film samples of magnetically coated polymer film. The magnetically coated polymer film has a magnetic side with aligned poles and a film side.
  Samples are cut to 15 mm×15 mm squares using the JDC cutter.
  Two samples to be tested are stacked with their respective magnetic sides in magnetic contact with each other and poles aligned.
  Double sided tape is applied to the respective film sides of the two samples that are in magnetic contact.
  A piece of double-sided tape is to each of the film sides of the two samples that are in magnetic contact. The double-sided tape is sized such that it does not extend beyond the edges of either of the two samples.
  One of the two samples is attached to the lower platen of test frame by adhering the double-side tape to compressible foam that is adhered by double-sided tape to the lower platen, as described in the figures below.

Test Procedure:
  The test procedure is described with respect to FIGS. 10-12, which shows schematically an apparatus utilized with a Universal Test Frame, such as an MTS Insight Series tensile tester. In general, "upper" and "lower" refers to the orientation as viewed schematically in FIGS. 10-12, with "upper" referring to toward the top of the FIG., and "lower" referring to toward the bottom of the FIG.
  The test procedure is performed utilizing TestWorks 4 Control Program: MJR Magnetic Z Separation Force, with the following settings:
  Contact Load=5 N
  Contact Time=5 seconds
  X-head Stop=15 mm
  Data Acquisition Rate=100 Hz
  Load Limit High=9 N
  Load Limit Low=−9 N
  Platen Separation=25 mm
  Separation Time=1 second
  Test Speed=0.05 mm/s
  Width 1=15 mm
  Width 2=15 mm
  The test is replicated three times, with the average value for the three replicated reported for each condition, such as each condition reported in the Table 1.

Figure 10:
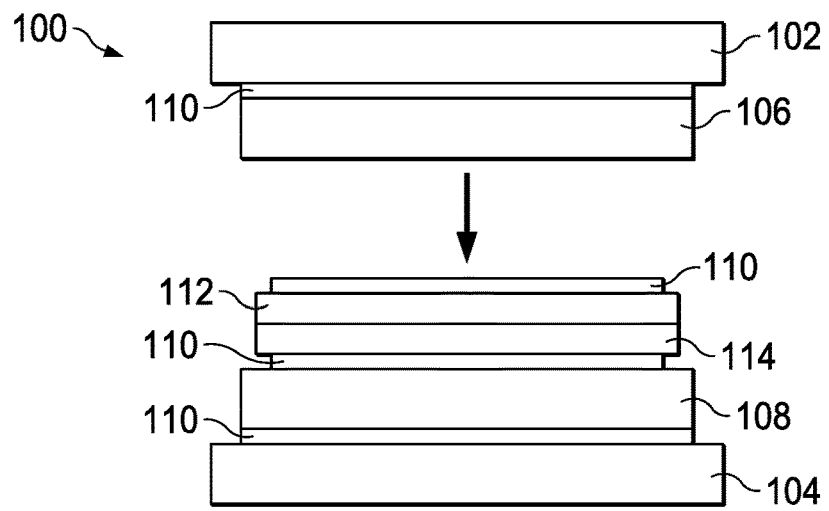
FIG. 10 is a schematic side view of a test apparatus.

As shown in FIG. 10:
  Compressible foam pieces 106 and 108 can be adhered to upper and lower platens 102 and 104, respectively. Adherence can be facilitated by double-sided tape 110.
  A first sample 112 of magnetized film is joined in a separable magnetically contacting state to a second sample 114 of magnetized film.
  The second sample 114 of magnetized film is adhered to the upper surface of the compressible foam piece 108. Adherence can be facilitated by double-sided tape 110.
  Double-sided tape 110 is adhered to the upper surface of the first sample 112.

Figure 11:
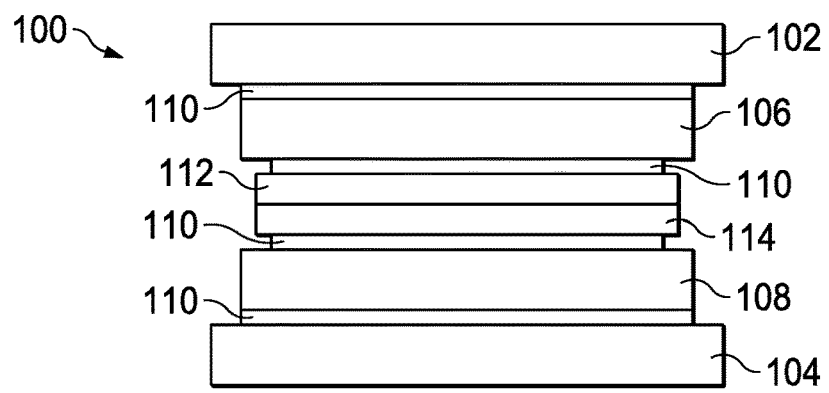
FIG. 11 is a schematic side view of a test apparatus.

As shown in FIG. 11:
  Upper platen 102 is lowered at a constant rate of 0.05 mm/s until the compressible foam piece 106 contacts the double-sided tape 110 that is adhered to the upper surface of the first sample 112, and a force of 5 N is achieved.
  The upper and lower platens hold the 5 N force for five seconds.

Figure 12:
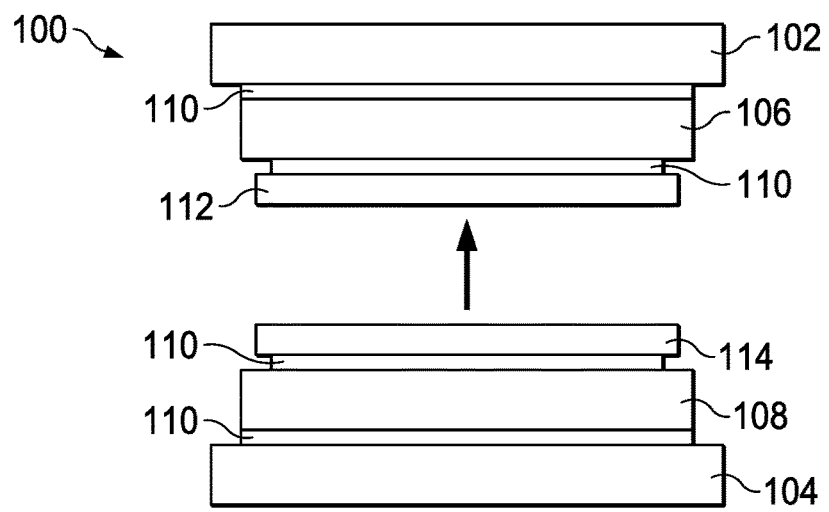
FIG. 12 is a schematic side view of a test apparatus.

As shown in FIG. 12:
  The upper platen 102 is raised at constant rate of 0.05 mm/s to cause separation of the first sample 112 of magnetized film from the second sample 114 of magnetized film.
  The force to separate is measured as the upper platen is raised until the force falls below 0.01 N.
  The maximum force is recorded, and divided by the area of the interface of the two magnetized film samples, and is reported in N/cm².
  The test is replicated three times, and the average value of N/cm² is reported.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for magnetizing a magnetizable ink, the method comprising the steps of:
   providing a printer;
   providing a web substrate;
   providing a printable magnetizable ink;
   providing a first pair of first and second cylindrical magnetic arrays in axially parallel and spaced relationship defining a first gap therebetween, the first and second cylindrical magnetic arrays comprising alternately spaced magnetized sections, the magnetized sections spaced apart axially by flux conducting elements, the magnetized sections of the first and second cylindrical magnetic arrays each comprising alternating north and south polarities, and paired to produce an external magnetic field in the gap;
   providing a second pair of third and fourth cylindrical magnetic arrays in axially parallel and spaced relationship defining a second gap therebetween, the second pair of cylindrical magnetic arrays comprising alternately spaced magnetized sections, the magnetized sections spaced apart axially by flux conducting elements, the magnetized sections of the third and fourth cylindrical magnetic arrays each comprising alternating north and south polarities, and paired to produce an external magnetic field in the gap;
   providing a third pair of fifth and sixth cylindrical magnetic arrays in axially parallel and spaced relationship defining a third gap therebetween, the fifth magnetic array comprising alternately spaced magnetized sections, the magnetized sections spaced apart axially by flux conducting elements, the sixth magnetic array comprising alternately spaced, contacting magnetized sections, the fifth and sixth cylindrical magnetic arrays each comprising alternating north and south polarities, and paired to produce an external magnetic field in the gap;
   positioning the first, second, and third pairs of cylindrical magnetic arrays to receive a web substrate through the first, second and third gaps, respectively, with the first and second pairs of cylindrical magnetic arrays being axially offset;
   depositing the magnetizable ink from the printer to the web substrate;
   curing the magnetizable ink by exposing the magnetizable ink to UV light having a wavelength between 300 nm and 500 nm;
   passing the web substrate through the first gap in contact with the first cylindrical magnetic array;
   passing the web substrate through the second gap in contact with the third cylindrical magnetic array;
   passing the web substrate through the third gap in contact with the fifth cylindrical magnetic array; and
   wherein the web substrate is moved at a sufficient rate to at least partially saturate the magnetic ink with the external magnetic fields produced in each gap to create alternating parallel magnetic poles in the magnetic ink.

2. The method of claim 1, wherein the magnetic ink comprises a UV-curable polymeric formulation.

3. The method of claim 1, wherein the magnetic ink comprises materials selected from the group consisting of monomers, oligomers, photoinitiators, and rare earth powder.

4. The method of claim 3, wherein the rare earth powder comprises NdFeB.

5. The method of claim 1, wherein the web substrate comprises a thermoplastic polymer.

6. The method of claim 1, further comprising the step of heating the web substrate prior to passing the web substrate through one of the first gap, second gap, and third gap.

7. The method of claim 1, wherein the first and second pairs of cylindrical magnetic arrays are axially offset a distance substantially equal to the width of one of the flux conducting elements.

8. A method for magnetizing a magnetizable ink, the method comprising the steps of:
   providing a web substrate comprising magnetizable ink;
   providing a first pair of first and second cylindrical magnetic arrays in axially parallel and spaced relationship defining a first gap therebetween, the cylindrical magnetic arrays comprising alternately spaced magnetized sections, the magnetized sections spaced apart axially by flux conducting elements, the magnetized sections of the first and second cylindrical magnetic arrays each comprising alternating north and south polarities, and paired to produce an external magnetic field in the gap;
   providing a second pair of third and fourth cylindrical magnetic arrays in axially parallel and spaced relationship defining a second gap therebetween, the second pair of cylindrical magnetic arrays comprising alternately spaced magnetized sections, the magnetized sections spaced apart axially by flux conducting elements, the magnetized sections of the third and fourth cylindrical magnetic arrays each comprising alternating north and south polarities, and paired to produce an external magnetic field in the gap;

providing a third pair of fifth and sixth cylindrical magnetic arrays in axially parallel and spaced relationship defining a third gap therebetween, the fifth magnetic array comprising alternately spaced magnetized sections, the magnetized sections spaced apart axially by flux conducting elements, the sixth magnetic array comprising alternately spaced, contacting magnetized sections, the fifth and sixth cylindrical magnetic arrays each comprising alternating north and south polarities, and paired to produce an external magnetic field in the gap;

positioning the first, second, and third pairs of cylindrical magnetic arrays to receive a web substrate through the first, second and third gaps, respectively, with the first and second pairs of cylindrical magnetic arrays being axially offset;

passing the web substrate through the first gap in contact with the first cylindrical magnetic array;

passing the web substrate through the second gap in contact with the third cylindrical magnetic array;

passing the web substrate through the third gap in contact with the fifth cylindrical magnetic array; and wherein the web substrate is moved at a sufficient rate to at least partially saturate the magnetic ink with the external magnetic fields produced in each gap to create alternating parallel magnetic poles in the magnetic ink.

9. The method of claim 8, wherein the magnetic ink comprises a UV-curable polymeric formulation.

10. The method of claim 8, wherein the magnetic ink comprises materials selected from the group consisting of monomers, oligomers, photoinitiators, and rare earth powder.

11. The method of claim 10, wherein the rare earth powder comprises NdFeB.

12. The method of claim 8, wherein the web substrate comprises a thermoplastic polymer.

13. The method of claim 8, further comprising the step of heating the web substrate prior to passing the web substrate through one of the first gap, second gap, and third gap.

14. The method of claim 1, wherein the first and second pairs of cylindrical magnetic arrays are axially offset a distance substantially equal to the width of one of the flux conducting elements.

15. An apparatus for magnetizing a magnetizable ink, the apparatus comprising:

a first pair of first and second cylindrical magnetic arrays in axially parallel and spaced relationship defining a first gap therebetween, the first and second cylindrical magnetic arrays each comprising alternately spaced magnetized sections, the magnetized sections being spaced apart axially by first flux conducting elements, the magnetized sections of the first and second cylindrical magnetic arrays each further comprising alternating north and south polarities, and paired to produce an external magnetic field in the gap;

a second pair of third and fourth cylindrical magnetic arrays in axially parallel and spaced relationship defining a second gap therebetween, the third and fourth cylindrical magnetic arrays each comprising alternately spaced magnetized sections, the magnetized sections being spaced apart axially by second flux conducting elements, the magnetized sections of the third and fourth cylindrical magnetic arrays each further comprising alternating north and south polarities, and paired to produce an external magnetic field in the gap;

a third pair of fifth and sixth cylindrical magnetic arrays in axially parallel and spaced relationship defining a third gap therebetween, the fifth magnetic array comprising alternately spaced magnetized sections, the magnetized sections spaced apart axially by third flux conducting elements, the sixth magnetic array comprising alternately spaced, contacting magnetized sections, the fifth and sixth cylindrical magnetic arrays each comprising alternating north and south polarities, and paired to produce an external magnetic field in the gap; and the first, second, and third pairs of cylindrical magnetic arrays positioned to receive a moving web substrate through the first, second and third gaps, respectively, and wherein the first and second pairs of cylindrical magnetic arrays are axially offset.

16. The apparatus of claim 15, wherein the first and second pairs of cylindrical magnetic arrays are axially offset a distance substantially equal to the width of one of the first flux conducting elements.

17. The apparatus of claim 15, wherein the first, second, and third flux conducting elements comprise iron cobalt alloy.

18. The apparatus of claim 15, further comprising a heat source, the heat source being in operative proximity to one of the first, second and third pairs of cylindrical magnetic arrays.

19. The apparatus of claim 15, further comprising a printer for printing a magnetizable ink on a web substrate.

20. The apparatus of claim 15, wherein the first and second pairs of cylindrical magnetic arrays are placed in circumferential alignment and the magnetic sections of each array face each other and the directions of magnetization N-S are in an opposed to relationship.

* * * * *